US008585868B2

(12) United States Patent
Venderbosch et al.

(10) Patent No.: US 8,585,868 B2
(45) Date of Patent: Nov. 19, 2013

(54) PYROLYSIS REACTOR

(75) Inventors: Robertus Hendrikus Venderbosch, Enschede (NL); Lambertus Van De Beld, Balkbrug (NL); Daan Assink, Enschede (NL); Elwin Gansekoele, Enschede (NL)

(73) Assignee: BTG BioLiquids B.V., Enschede (NL)

( * ) Notice: Subject to any disclaimer, the term of this patent is extended or adjusted under 35 U.S.C. 154(b) by 381 days.

(21) Appl. No.: 12/669,727

(22) PCT Filed: Jul. 19, 2008

(86) PCT No.: PCT/NL2008/050498
§ 371 (c)(1), (2), (4) Date: Mar. 3, 2010

(87) PCT Pub. No.: WO2009/014436
PCT Pub. Date: Jan. 29, 2009

(65) Prior Publication Data

US 2010/0196227 A1 Aug. 5, 2010

(30) Foreign Application Priority Data

Jul. 22, 2007 (NL) ..................................... 2000772

(51) Int. Cl.
*C10B 1/04* (2006.01)
*C10B 49/08* (2006.01)

(52) U.S. Cl.
USPC ............................................ 202/99; 202/208

(58) Field of Classification Search
USPC ............. 202/99, 208; 201/12, 34, 4; 432/215, 432/27; 422/228, 229
See application file for complete search history.

(56) References Cited

U.S. PATENT DOCUMENTS

| | | | |
|---|---|---|---|
| 4,038,045 A | 7/1977 | Rammler et al. | |
| 4,466,863 A * | 8/1984 | Rammler et al. | 202/99 |

FOREIGN PATENT DOCUMENTS

| | | |
|---|---|---|
| CA | 2618000 A1 | 2/2007 |
| DE | 19738106 A1 | 3/1999 |
| WO | 03106590 A1 | 12/2003 |
| WO | 2007017005 A1 | 2/2007 |

* cited by examiner

*Primary Examiner* — Jill Warden
*Assistant Examiner* — Joye L Woodard
(74) *Attorney, Agent, or Firm* — The Webb Law Firm

(57) ABSTRACT

A device for pyrolysing biomass comprises: a reactor space; a first feed for biomass material connecting to the upper zone thereof; a second feed for heated heat carrier material connecting to the upper side of the reactor space; a first discharge for pyrolysis gas connecting to the upper zone of the reactor space at a distance from the first feed; and a second discharge for solid material, for instance carbon and heat carrier material, connecting to the underside of the reactor space. A substantial separation between the discharge flows of pyrolysis gas and solid material takes place predominantly under the influence of gravitational force, without interposing of a cyclone. The reactor space is modeled such that the direct flow from the first feed and the second feed to the first discharge is blocked. A mechanical mixer is present in the reactor space for the purpose of mixing the flow of biomass material with the flow of preheated heat carrier material.

10 Claims, 1 Drawing Sheet

PYROLYSIS REACTOR

BACKGROUND OF THE INVENTION

The invention relates to a device for subjecting biomass to pyrolysis, which device comprises:

a reactor with a housing and a reactor space present therein;

a first feed for biomass material or other organic material connecting to the upper zone of this reactor space;

a second feed for heated heat carrier material, for instance sand, connecting to the upper side of this reactor space;

a first discharge for pyrolysis gas connecting to the upper zone of this reactor space at a distance from the first feed; and a second discharge for solid material, for instance carbon and heat carrier material, connecting to the underside of this reactor space.

Such a reactor is known in many embodiments from, among others, WO-A-03/106590, WO-A-2007/017005 and DE-A-197 38 106.

Pyrolysis gas already occurs in the reactor space in the region of the mixer. This gas entrains fine carbon particles. The undesirable phenomenon may hereby occur that these fine particles accumulate in a separating cyclone forming part of the device, and cause blockage thereof after a period of time.

It is an object of the invention to solve this problem.

SUMMARY OF THE INVENTION

In this respect the invention provides a device of the above described type which has the feature that the reactor space is modelled such that the direct flow from the first feed and the second feed to the first discharge is blocked;

a mechanical mixer is present in the reactor space for the purpose of mixing the incoming flow of biomass material with the incoming flow of preheated heat carrier material; and the maximum average velocity of the gas and the thereby entrained material in the reactor space downstream of the mixer at a temperature in the range of about 400° C.-550° C. is about as great as the terminal falling velocity, such that at least a substantial separation between the discharge flows of respectively pyrolysis gas and solid material takes place predominantly, and in any case for more than 50%, under the influence of gravitational force, in particular without interposing of a cyclone.

These measures according to the invention can effectively prevent any clogging and blocking occurring, despite the carbon and other solid material being of a somewhat tacky nature.

The structure according to the invention is able to wholly prevent the described undesirable phenomenon of the prior art. Carbon and, depending on the composition of the biomass, sometimes non-converted fibres and heat carrier material is discharged according to the invention substantially only via the second discharge, and the first discharge discharges substantially only pyrolysis gas.

Other than in the prior art, a direct flow, to be considered a short-cut flow, from the first feed and the second feed to the first discharge is effectively prevented according to the invention.

According to the invention substantially all solid particles are separated from the pyrolysis gas in the first part of the reactor where the mechanical mixer is situated.

The described separation can be effected in diverse ways. The reactor can for instance consist of two sub-spaces, i.e. the actual reactor space in which the mixer is situated, and a discharge part which connects on the underside to the lower part of said first sub-space and which connects on the upper side to the first discharge.

The velocity can for instance be set such that $v<10$ m/s, preferably $v<5$ m/s, more preferably $v<2$ m/s, and for a practically complete separation $v<1$ m/s.

In another embodiment the device has the special feature that an at least more or less vertical baffle is situated in the reactor space which connects to the upper wall of the reactor space, whereby the flow from the mixer, comprising a mixture of pyrolysis gas and solid material, and/or the part-flows of pyrolysis gas and solid material can only reach respectively the first discharge and the second discharge by passing over the lower edge of the baffle.

The reactor is preferably embodied such that the lower zone of the reactor space has a form narrowing toward the second discharge.

BRIEF DESCRIPTION OF THE DRAWINGS

The invention will now be elucidated on the basis of the accompanying drawings.

In the drawings the FIGS. 1, 2, 3 and 4 show four respective random exemplary embodiments of the pyrolysis reactor according to the invention.

Functionally corresponding components are designated in all the figures with the same reference numerals. The design and relation to other components may differ in the different embodiments.

DETAILED DESCRIPTION OF THE INVENTION

Figure 1:
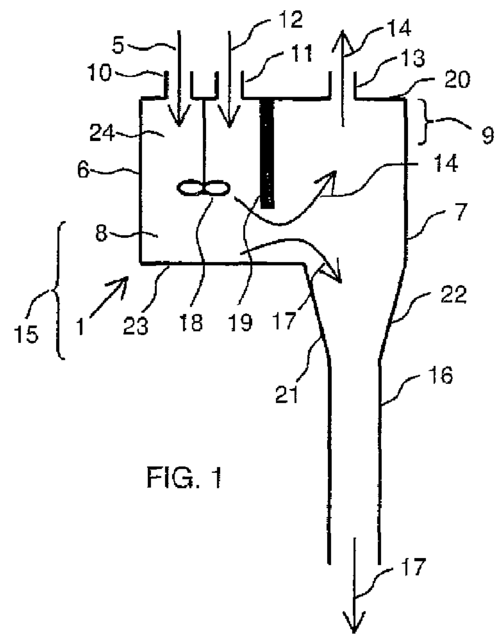

FIG. 1 shows a device 1 for subjecting a flow of biomass material or other organic material 5 to pyrolysis. The device comprises a reactor 6 with a housing 7 and a reactor space 8 present therein, a first feed 10 for a flow of biomass material 5 connecting to the upper zone 9 of this reactor space 8, a second feed 11 for preheated heat carrier material 12 connecting to the upper part 9 of this reactor space 8, a discharge 13 for pyrolysis gas 14 connecting to upper zone 9 of reactor space 8, this discharge 13 being in the shown manner a substantial distance from first and second feeds 10, 11, in addition to a second discharge 16 for a flow of solid material 17, such as carbon, possibly remaining fibres and heat carrier material, connecting to lower zone 15 of reactor space 8.

The separation between the discharge flows of pyrolysis gas 14 and solid material 17 takes place substantially only under the influence of gravitational force, since the average velocity of the gas and the solid material entrained thereby has a low value, for instance 5 m/s, downstream of mixer 18. By way of comparison: a cyclone generates flow speeds in the order of 20 m/s and more. Otherwise than a known pyrolysis reactor, device 1 does not comprise a cyclone.

Reactor space 8 is modelled such that the direct flow from first feed 10 and second feed 11 to first discharge 13 is blocked, so that no "short-cut flow" can occur. The flows 14 and 17 in reactor space 8 are indicated with arrows. It will be apparent that these arrows serve only by way of orientation, and that the actual flows have a more complex character.

Present in reactor space 8 is a mechanical mixer 18, the schematically drawn blades of which are driven rotatingly by a motor (not shown). The mixer serves to mix the flow of biomass material 5 with heated heat carrier material 12 such as sand.

Situated in reactor space 8 is a vertical baffle 19 which connects against upper wall 20 of reactor space 8.

The lower zone 15 of reactor space 8 has a form narrowing toward second discharge 16. Side walls 21, 22 of this narrowing part have an angle to the vertical of less than 30°.

Figure 2:
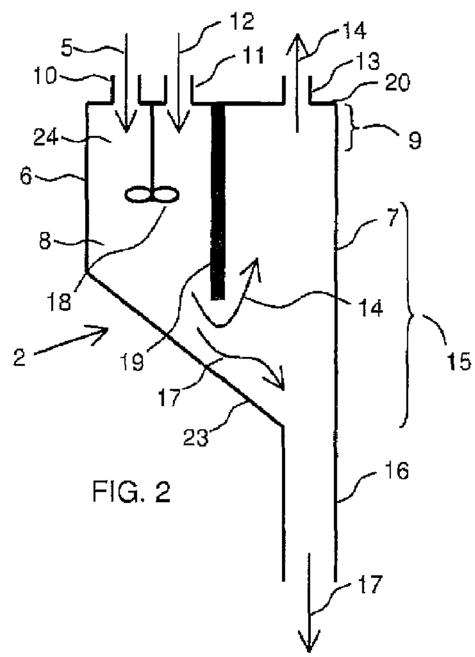

FIG. 2 shows a reactor 2 with a construction differing from that of FIG. 1 in the sense that baffle 19 has a greater vertical dimension but is still roughly the same distance from wall 23 located thereunder (this wall 23 having an inclining position in this embodiment) as from the horizontally placed wall 23 in the embodiment of FIG. 1.

Figure 3:
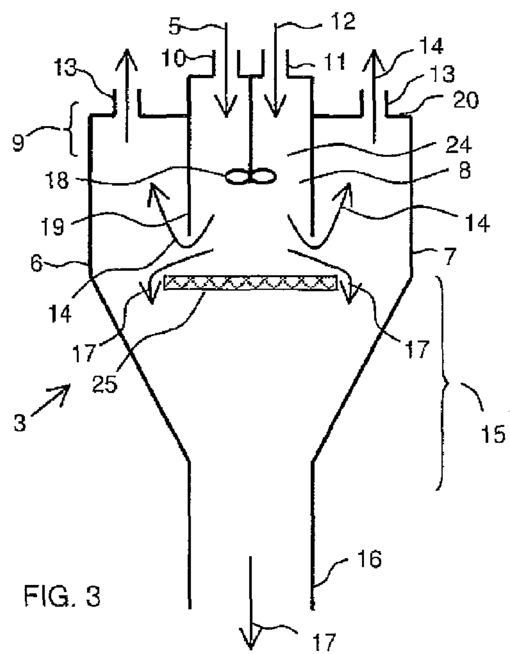

FIG. 3 shows a device 3 in which a central peripheral baffle 19 connects to upper wall 20. Situated on the underside of mixer space 24 is a horizontal deflecting battle 25 which deflects flows 14, 17 laterally in the shown manner such that the flow of pyrolysis gas 14 undergoes a certain change in direction and can thus be more easily discharged to the two first discharges 13.

Figure 4:
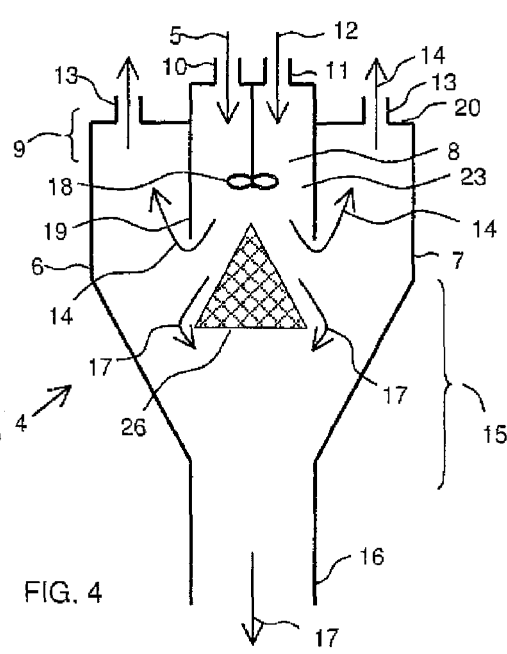

FIG. 4 shows a reactor 4 which differs from reactor 3 of FIG. 3 in the sense that the horizontal deflecting battle 25 is replaced by a roughly cone-shaped deflecting body 26 which makes it easy for the flow of solid material 17 to be guided downward in the direction of second discharge 16.

The invention claimed is:

1. A device for subjecting biomass to pyrolysis, which device comprises:

a reactor with a housing and a reactor space present therein;

a first feed for biomass material or other organic material connecting to an upper zone of the reactor space;

a second feed for preheated heat carrier material, for instance sand, connecting to the upper zone of the reactor space;

a moving mechanical mixer for the purpose of mixing the incoming flow of biomass material or other organic material with the incoming flow of preheated heat carrier material, wherein the first feed and second feed connect to the upper zone of the reactor space above the moving mechanical mixer;

a laterally deflecting surface which laterally deflects flows of pyrolysis gas and thereby entrained solid material from the moving mechanical mixer;

a first discharge for the pyrolysis gas connecting to the upper zone of the reactor space at a distance from the first feed;

a second discharge for the solid material, for instance carbon and heat carrier material, connecting to an underside of the reactor space;

a substantially vertical baffle situated in the reactor space, wherein the substantially vertical baffle has a lower edge that extends below the moving mechanical mixer and above the laterally deflecting surface, whereby the deflected flows from the moving mechanical mixer can only reach the first discharge and the second discharge by passing under the lower edge of the baffle; and a flow separation zone downstream of the moving mechanical mixer and between the first discharge and the second discharge, wherein the maximum average velocity (v) of the pyrolysis gas and the thereby entrained solid material in the flow separation zone at a temperature in the range of about 400° C.-550° C. is about as great as the terminal falling velocity, such that at least a substantial separation between the discharge flows of respectively pyrolysis gas and the solid material takes place predominantly under the influence of gravitational force, in particular without interposing of a cyclone.

2. The device as claimed in claim 1, wherein the maximum average velocity (v) is 10 m/s.

3. The device as claimed in claim 1, wherein the maximum average velocity (v) is 5 m/s.

4. The device as claimed in claim 1, wherein the maximum average velocity (v) is 2 m/s.

5. The device as claimed in claim 1, wherein the maximum average velocity (v) is 1 m/s.

6. The device as claimed in claim 1, wherein the substantially vertical baffle connects to an upper wall of the reactor space.

7. The device as claimed in claim 6, wherein a lower zone of the reactor space has a form narrowing toward the second discharge.

8. The device as claimed in claim 1, wherein a lower zone of the reactor space has a form narrowing toward the second discharge.

9. The device as claimed in claim 1, wherein the moving mechanical mixer is a rotatable mechanical mixer.

10. The device as claimed in claim 1, wherein the laterally deflecting surface is a horizontal wall, an inclined wall, a horizontally deflecting baffle or a cone-shaped deflecting body.

* * * * *

UNITED STATES PATENT AND TRADEMARK OFFICE
CERTIFICATE OF CORRECTION

PATENT NO. : 8,585,868 B2
APPLICATION NO. : 12/669727
DATED : November 19, 2013
INVENTOR(S) : Venderbosch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 423 days.

Signed and Sealed this
Twenty-second Day of September, 2015

Michelle K. Lee
*Director of the United States Patent and Trademark Office*